(12) United States Patent
Shiue et al.

(10) Patent No.: US 7,724,708 B2
(45) Date of Patent: May 25, 2010

(54) CHANNEL SWITCHING METHOD FOR USE WITH WIRELESS PERIPHERAL DEVICE

(75) Inventors: Tsung-Wen Shiue, Taipei (TW); Chun-Nan Su, Taipei (TW); Chien-Nan Lin, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 395 days.

(21) Appl. No.: 11/742,993

(22) Filed: May 1, 2007

(65) Prior Publication Data
US 2008/0137545 A1  Jun. 12, 2008

(30) Foreign Application Priority Data
Dec. 8, 2006  (TW) .............................. 95145923 A

(51) Int. Cl.
*H04W 4/00* (2009.01)
(52) U.S. Cl. ..................... 370/332; 370/338; 370/341
(58) Field of Classification Search ......... 370/276–278, 370/282, 328–329, 332–333, 338, 341, 431, 370/437
See application file for complete search history.

(56) References Cited

U.S. PATENT DOCUMENTS

| | | | | |
|---|---|---|---|---|
| 7,027,418 B2* | 4/2006 | Gan et al. | ................... | 370/329 |
| 7,477,624 B2* | 1/2009 | Gan et al. | ................... | 370/329 |
| 7,570,614 B2* | 8/2009 | Treister et al. | ............... | 370/329 |
| 2002/0122413 A1* | 9/2002 | Shoemake | ................... | 370/349 |
| 2005/0243058 A1* | 11/2005 | Morris et al. | ................ | 345/158 |
| 2005/0254647 A1* | 11/2005 | Anandakumar et al. | ........ | 380/42 |
| 2007/0183338 A1* | 8/2007 | Singh et al. | .................. | 370/252 |
| 2007/0218841 A1* | 9/2007 | Wright | ...................... | 455/63.3 |
| 2008/0107071 A1* | 5/2008 | Tsigler et al. | ................ | 370/329 |

* cited by examiner

*Primary Examiner*—Tri H Phan
(74) *Attorney, Agent, or Firm*—Kirton & McConkie; Evan R. Witt

(57) ABSTRACT

The present invention provides a channel switching method for use with a wireless mouse by intelligently switching the communication channels with a wireless signal receiver. Firstly, the packet error rate is detected to discriminate whether the number of continuous failed packets is greater than a threshold value. Subsequently, the received signal strength indicator (RSSI) is detected to discriminate whether the wireless transmitter needs to switch the current communication channel with the wireless signal receiver.

5 Claims, 2 Drawing Sheets

CHANNEL SWITCHING METHOD FOR USE WITH WIRELESS PERIPHERAL DEVICE

FIELD OF THE INVENTION

The present invention relates to a channel switching method for use with a wireless peripheral device, and more particularly to a channel switching method for use with a wireless mouse by intelligently switching the communication channels with a wireless signal receiver. The present invention relates to a data receiving method for use with a wireless signal receiver to receive data from a wireless transmitter.

BACKGROUND OF THE INVENTION

Nowadays, wireless communication technologies have experienced great growth and are now rapidly gaining in popularity. As a result, many peripheral devices of computer system were developed according to wireless communication technologies, so that signals or data are transmitted between the peripheral devices and the host computer. Among the wireless peripheral devices, wireless keyboard, wireless mouse, wireless earphone, wireless microphone and the like are prevailing. When a wireless peripheral device is operated, a corresponding wireless signal receiver is employed for receiving the wireless signal delivered from the wireless peripheral device. Generally, the wireless signal receiver is connected to an extension slot of the host computer. Therefore, the signals generated from the wireless peripheral device can be transmitted to the host computer via the wireless signal receiver.

The common wireless communication protocols are usually operated in the bandwidth of for example 2.4 G Hz. Devices communicating by means a specified wireless technology run the risk of encountering interference in environments where other wireless technologies are in use. For reducing interference between wireless technologies sharing the 2.4 GHz spectrum, a so-called automatic frequency hopping method was developed. Frequency hopping devices can know which frequencies are occupied by other users of the band and then rapidly switched among other frequency channels.

In wireless transmission, packet error rate is a measure of discriminating whether the channel frequency has to be switched. A method of estimating the packet error rate caused by interference utilizes a radio frequency integrated circuit (RFIC) to detect the interference level, thereby discriminating whether the channel is encountering interference. However, if the wireless peripheral device is relatively far from the host computer, it is usually deemed that channel switching is necessary. As known, too frequent channel switching may increase power consumption.

Another method of discriminating whether the channel-switching is required utilizes a received signal strength indicator (RSSI) to indicate how strong a signal is at a receiver. RSSI is measured in each channel in order to specify a frequency channel being used in a wireless communication by another communication apparatus, and if specified, such a frequency channel is avoided based upon the measurement result. In a case that a wireless peripheral device employs a lower-level RFIC when taking cost into account, insufficient number of frequency channels are provided for performing channel-switching. Under this circumstance, the threshold value associated with each channel is so high that the packet lost rate is increased.

In views of the above-described disadvantages resulted from the prior art, the applicant keeps on carving unflaggingly to develop a channel switching method according to the present invention through wholehearted experience and research.

SUMMARY OF THE INVENTION

It is an object of the present invention to provide a channel switching method for use with a wireless peripheral device by intelligently switching the communication channels with a wireless signal receiver, in which the packet error rate and the RSSI are collectively detected to whether the wireless transmitter needs to switch the current communication channel with the wireless signal receiver. By utilizing the channel switching method of the present invention, the problems resulted from too frequent channel switching, too much power consumption and high packet lost rate when either packet error rate or RSSI is individually used will be solved.

In accordance with an aspect of the present invention, there is provided a channel switching method of a wireless peripheral device for use with a wireless transmitter by intelligently switching the communication channels with a signal receiving device. Firstly, a packet error rate check is made to count the number of continuous failed packets when the wireless transmitter delivers data to the signal receiving device through a first primary channel. If the number of continuous failed packets is greater than a threshold value, a received signal strength indicator of the first primary channel is detected to discriminate whether the first primary channel is being used. If the first primary channel is not being used, the wireless transmitter delivers data to the signal receiving device through the first primary channel for the second time and the number of continuous failed packets is counted. Then the wireless transmitter delivers a channel switching notification to the signal receiving device by polling at least one sub channel provided that the first primary channel is not being used, and delivers data to the signal receiving device through a second primary channel until the signal receiving device successfully receives the channel switching notification. If the first primary channel is being used, a received signal strength indicator of a second primary channel is detected to discriminate whether the second primary channel is being used. If the second primary channel is not being used, the wireless transmitter delivers a channel switching notification to the signal receiving device by polling at least one sub channel, and the wireless transmitter delivers data to the signal receiving device through the second primary channel if the signal receiving device has successfully received the channel switching notification. The wireless transmitter delivers the channel switching notification to the signal receiving device by successively polling four sub channels.

In accordance with another aspect of the present invention, there is provides a data receiving method for use with a signal receiving device to receive data from a wireless transmitter.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a channel switching method for use with a wireless peripheral device by intelligently switching the communication channels with a wireless signal receiver. An exemplary wireless peripheral device is a wireless mouse. The wireless mouse has a wireless transmitter therein for emitting a wireless signal. A corresponding wireless signal receiver is connected to a host computer. Via the wireless signal receiver, the wireless signal or data delivered from the wireless mouse can be transmitted to the host computer. Generally, the communication channels between the wireless transmitter and the wireless signal receiver includes two types, i.e. the primary channel and the secondary channel. The common data are transmitted through the primary channel. Whereas, the channel switching notification is transmitted through the secondary channel.

Figure 1:
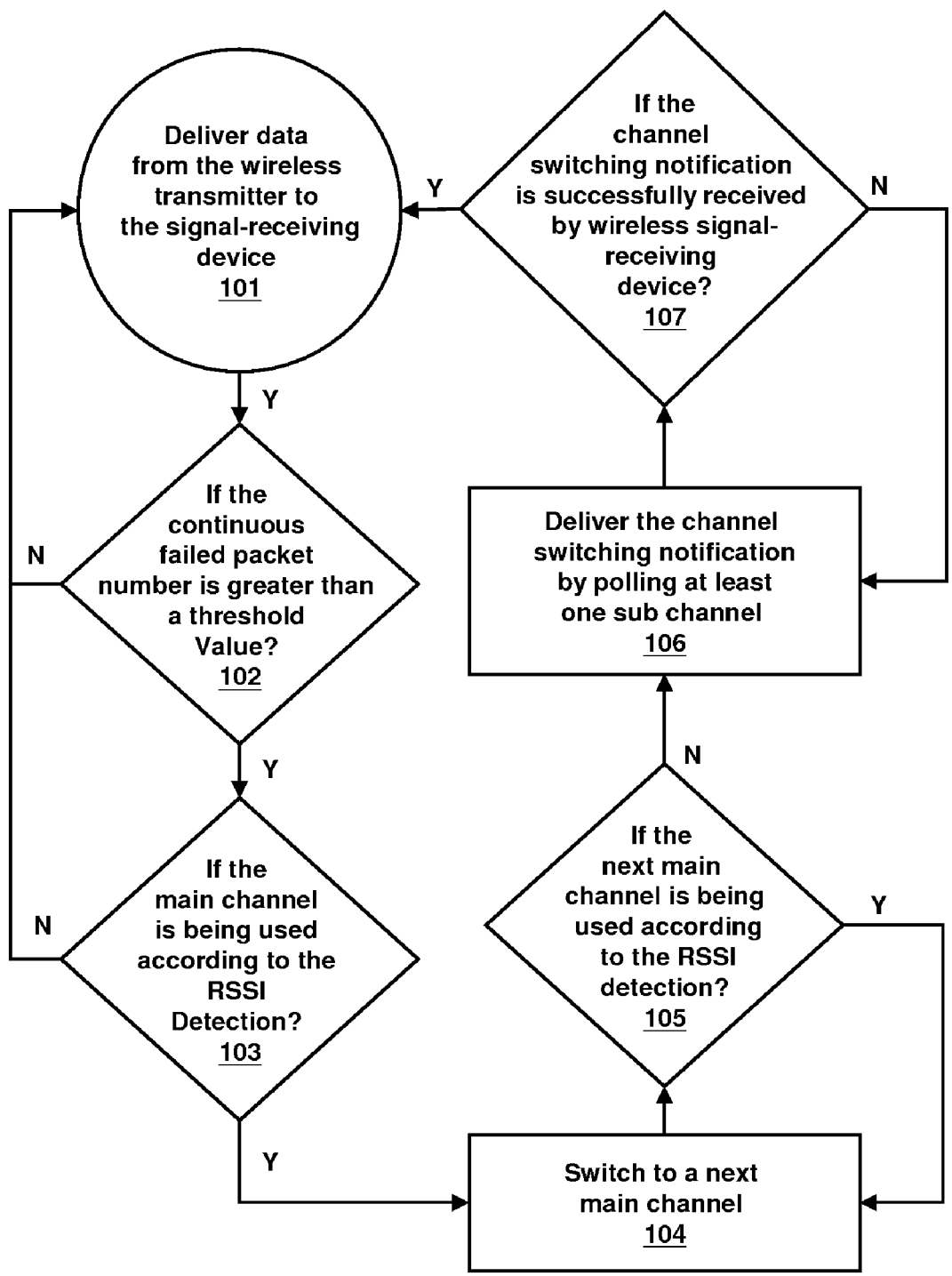
FIG. 1 is a flowchart illustrating a channel switching method according to a first preferred embodiment of the present invention.

Hereinafter, the flowchart of a channel switching method according to the present invention will be illustrated with reference to FIG. 1.

First of all, the wireless transmitter delivers data to the wireless signal receiver (Step 101). If the number of continuous failed packets is greater than a threshold value (e.g. 3) by making a packet error rate check (Step 102), the wireless transmitter detects the received signal strength indicator (RSSI) to discriminate whether the primary channel (first primary channel) is being used in a wireless communication (Step 103). Otherwise, the wireless transmitter continuously delivers data to the wireless signal receiver.

In a case that the RSSI detection shows the first primary channel is not being used, the wireless transmitter continuously delivers data to the wireless signal receiver through the primary channel (first primary channel) (Step 101) and it is continuously detected whether the number of continuous failed packets is greater than the threshold value (Step 102). If the number of continuous failed packets is greater than the threshold value, the wireless transmitter detects the received signal strength indicator (RSSI) for the second time to discriminate whether the primary channel (first primary channel) is being used in a wireless communication (Step 103). In a case that the RSSI detection shows the first primary channel is not being used, the wireless transmitter continuously delivers data to the wireless signal receiver through the primary channel (first primary channel) for the third time (Step 101) and it is continuously detected whether the number of continuous failed packets is greater than the threshold value (Step 102). Next, if the number of continuous failed packets is greater than the threshold value and the RSSI detection shows the first primary channel is not being used, the wireless transmitter delivers the channel switching notification to the wireless signal receiver by polling at least one secondary channel so as to forcibly switch channel. Until the wireless signal receiver successfully receives the channel switching notification, the wireless transmitter will deliver data to the wireless signal receiver through a next primary channel (second primary channel).

In another case that the RSSI detection shows the first primary channel is being used, the wireless transmitter switches the communication channel to a next primary channel (second primary channel) (Step 104). Then, the wireless transmitter detects the received signal strength indicator (RSSI) to discriminate whether the second primary channel is being used in a wireless communication (Step 105).

If the RSSI detection shows the second primary channel is being used, the Step 104 and Step 105 are repeated. In other words, the wireless transmitter switches the communication channel to a next primary channel (third primary channel, fourth primary channel, and so on), and the wireless transmitter detects the received signal strength indicator (RSSI) to discriminate whether the next primary channel is being used in a wireless communication. In an embodiment of intelligently switching the communication channels of the wireless mouse with the wireless signal receiver, thirteen primary channels are provided to be selected by the wireless mouse. That is, if the RSSI detection shows one primary channel is being used, the wireless transmitter switches the communication channel to a next primary channel.

If the RSSI detection shows the next primary channel is not being used, the wireless transmitter delivers the channel switching notification to the wireless signal receiver by polling at least one secondary channel (Step 106). If the wireless signal receiver successfully receives the channel switching notification (Step 107), the wireless transmitter will deliver data to the wireless signal receiver through the primary channel which is not being used (Step 101). Whereas, if the wireless signal receiver has not received the channel switching notification through a given secondary channel, the wireless transmitter continuously delivers the channel switching notification to the wireless signal receiver through another secondary channel until the wireless signal receiver has not received the channel switching notification for a polling time exceeding a preset value (e.g. 10 seconds). Meanwhile, the wireless transmitter will be put into a sleep state in order to reduce power consumption. In an embodiment of intelligently switching the communication channels of the wireless mouse with the wireless signal receiver, four secondary channels are provided to be polled by the wireless transmitter to realize whether the channel switching notification has been received.

In the above embodiment, the channel switching method can be applied to a wireless transmitter by intelligently switching the communication channels with a wireless signal receiver. The channel switching method principally utilizes two detecting mechanisms to discriminate whether the channel switching is required. In the first detecting mechanism, the packet error rate is detected to discriminate whether the number of continuous failed packets is greater than a threshold value. In the second detecting mechanism, the received signal strength indicator (RSSI) is detected to discriminate whether the wireless transmitter needs to switch the current communication channel with the wireless signal receiver. Since the packet error rate and the RSSI are both detected, the problems resulted from too frequent channel switching and too much power consumption of the wireless transmitter will be overcome.

The present invention further provides a data receiving method for use with a wireless signal receiver to receive data from a wireless transmitter. An exemplary wireless transmitter is a wireless mouse. The wireless signal receiver is connected to a host computer. Via the wireless signal receiver, the wireless signal or data delivered from the wireless transmitter can be transmitted to the host computer. Likewise, the communication channels between the wireless transmitter and the wireless signal receiver includes two types, i.e. the primary channel and the secondary channel. The common data are transmitted through the primary channel. Whereas, the channel switching notification is transmitted through the secondary channel.

Figure 2:
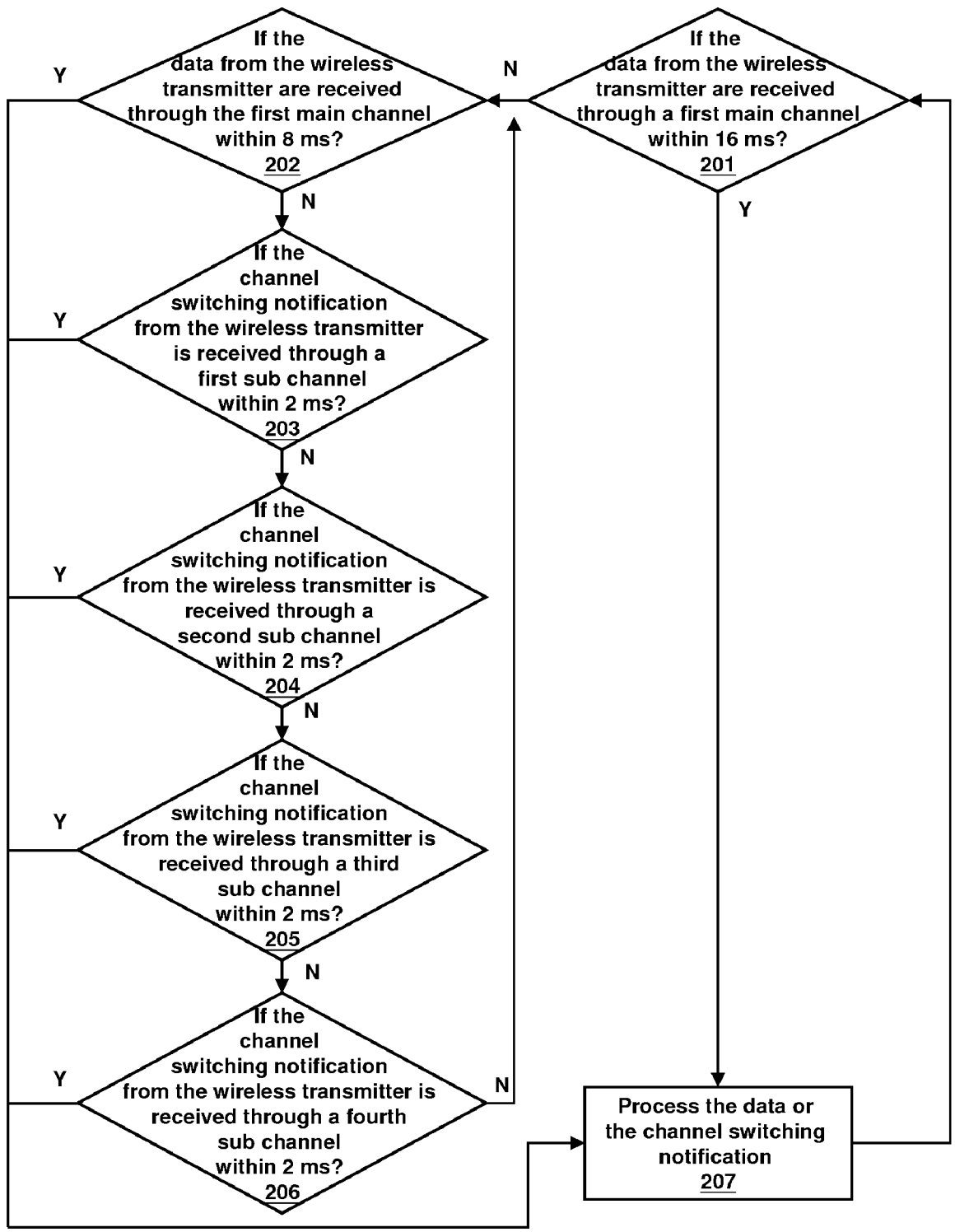
FIG. 2 is a flowchart illustrating a data receiving method according to a second preferred embodiment of the present invention.

Hereinafter, the flowchart of a data receiving method according to the present invention will be illustrated with reference to FIG. 2.

First of all, the wireless signal receiver tries to receive the data delivered from the wireless transmitter through the first primary channel at the waiting time of 16 ms (Step 201). If the wireless signal receiver has received the data delivered from the wireless transmitter through the first primary channel within 16 ms, the subsequent data processing operation is implemented (Step 207). Otherwise, if the wireless signal receiver has not received the data delivered from the wireless transmitter through the first primary channel within 16 ms, the wireless signal receiver tries to continuously receive the data delivered from the wireless transmitter through the first primary channel at the waiting time of 8 ms (Step 202).

If the wireless signal receiver has received the data delivered from the wireless transmitter through the first primary channel within 8 ms, the subsequent data processing operation is implemented (Step 207). Otherwise, if the wireless signal receiver has not received the data delivered from the wireless transmitter through the first primary channel within 8 ms, the wireless signal receiver tries to continuously receive the channel switching notification delivered from the wireless transmitter through the first secondary channel at the waiting time of 2 ms (Step 203).

If the wireless signal receiver has received the channel switching notification delivered from the wireless transmitter through the first secondary channel within 2 ms, the subsequent data processing operation is implemented (Step 207). Under this circumstance, the wireless transmitter switches the communication channel to a next primary channel (second primary channel) and thus the wireless transmitter delivers data to the wireless signal receiver through the second primary channel. Otherwise, if the wireless signal receiver has not received the channel switching notification delivered from the wireless transmitter through the first secondary channel within 2 ms, the wireless signal receiver tries to continuously receive the channel switching notification delivered from the wireless transmitter through the second secondary channel at the waiting time of 2 ms (Step 204).

If the wireless signal receiver has received the channel switching notification delivered from the wireless transmitter through the second secondary channel within 2 ms, the subsequent data processing operation is implemented (Step 207). Under this circumstance, the wireless transmitter delivers data to the wireless signal receiver through the second primary channel. Otherwise, if the wireless signal receiver has not received the channel switching notification delivered from the wireless transmitter through the second secondary channel within 2 ms, the wireless signal receiver tries to continuously receive the channel switching notification delivered from the wireless transmitter through the third secondary channel at the waiting time of 2 ms (Step 205).

If the wireless signal receiver has received the channel switching notification delivered from the wireless transmitter through the third secondary channel within 2 ms, the subsequent data processing operation is implemented (Step 207). Under this circumstance, the wireless transmitter delivers data to the wireless signal receiver through the second primary channel. Otherwise, if the wireless signal receiver has not received the channel switching notification delivered from the wireless transmitter through the third secondary channel within 2 ms, the wireless signal receiver tries to continuously receive the channel switching notification delivered from the wireless transmitter through the fourth secondary channel at the waiting time of 2 ms (Step 206).

If the wireless signal receiver has received the channel switching notification delivered from the wireless transmitter through the fourth secondary channel within 2 ms, the subsequent data processing operation is implemented (Step 207). Under this circumstance, the wireless transmitter delivers data to the wireless signal receiver through the second primary channel. Otherwise, if the wireless signal receiver has not received the channel switching notification delivered from the wireless transmitter through the fourth secondary channel within 2 ms, the Step 202 is repeated. Meanwhile, the wireless signal receiver tries to continuously receive the data delivered from the wireless transmitter through the first primary channel at the waiting time of 8 ms (Step 202)

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A channel switching method for use with a wireless transmitter of a wireless peripheral device by intelligently switching a plurality of communication channels with a signal receiving device, said channel switching method comprising steps of:

making a packet error rate check to count number of continuous failed packets when said wireless transmitter delivers data to said signal receiving device through a first primary channel; and detecting a received signal strength indicator of said first primary channel if the number of continuous failed packets is greater than a threshold value, thereby discriminating whether said first primary channel is being used, wherein if said first primary channel is not being used, said wireless transmitter delivers data to said signal receiving device through said first primary channel for the second time and the number of continuous failed packets is counted, and then said wireless transmitter delivers a channel switching notification to said signal receiving device by polling at least one sub channel provided that said first primary channel is not being used, and delivers data to said signal receiving device through a second primary channel until said signal receiving device successfully receives said channel switching notification, and wherein if said first primary channel is being used, a received signal strength indicator of a second primary channel is detected to discriminate whether said second primary channel is being used, and if said second primary channel is not being used, said wireless transmitter delivers a channel switching notification to said signal receiving device by polling at least one sub channel, and said wireless transmitter delivers data to said signal receiving device through said second primary channel if said signal receiving device has successfully received said channel switching notification, and said wireless transmitter delivers said channel switching notification to said signal receiving device by successively polling four sub channels.

2. The channel switching method according to claim 1 wherein said wireless transmitter enters a sleep state if said signal-receiving device has not successfully received said channel switching notification within 10 seconds.

3. The channel switching method according to claim 1 wherein said wireless transmitter is included in a wireless mouse and said signal-receiving device is a receiver.

4. A channel switching method for use with a wireless transmitter of a wireless peripheral device by intelligently switching a plurality of communication channels with a signal receiving device, said channel switching method comprising steps of:

making a packet error rate check to count number of continuous failed packets when said wireless transmitter delivers data to said signal receiving device through a first primary channel; and detecting a received signal strength indicator of said first primary channel if the number of continuous failed packets is greater than a threshold value, thereby discriminating whether said first primary channel is being used, wherein if said first primary channel is not being used, said wireless transmitter delivers data to said signal receiving device through said first primary channel for the second time and the number of continuous failed packets is counted, and then said wireless transmitter delivers a channel switching notification to said signal receiving device by polling at least one sub channel provided that said first primary channel is not being used, and delivers data to said signal receiving device through a second primary channel until said signal receiving device successfully receives said channel switching notification.

5. A channel switching method for use with a wireless transmitter of a wireless peripheral device by intelligently switching a plurality of communication channels with a signal receiving device, said channel switching method comprising steps of:

making a packet error rate check to count number of continuous failed packets when said wireless transmitter delivers data to said signal receiving device through a first primary channel; and detecting a received signal strength indicator of said first primary channel if the number of continuous failed packets is greater than a threshold value, thereby discriminating whether said first primary channel is being used, wherein if said first primary channel is being used, a received signal strength indicator of a second primary channel is detected to discriminate whether said second primary channel is being used, and if said second primary channel is not being used, said wireless transmitter delivers a channel switching notification to said signal receiving device by polling at least one sub channel, and said wireless transmitter delivers data to said signal receiving device through said second primary channel if said signal receiving device has successfully received said channel switching notification, and said wireless transmitter delivers said channel switching notification to said signal receiving device by successively polling four sub channels.

\* \* \* \* \*